J. CUTTS AND W. C. GILLOTT.
FLUID PRESSURE GAUGE.
APPLICATION FILED SEPT. 3, 1915.
1,406,616.
Patented Feb. 14, 1922.
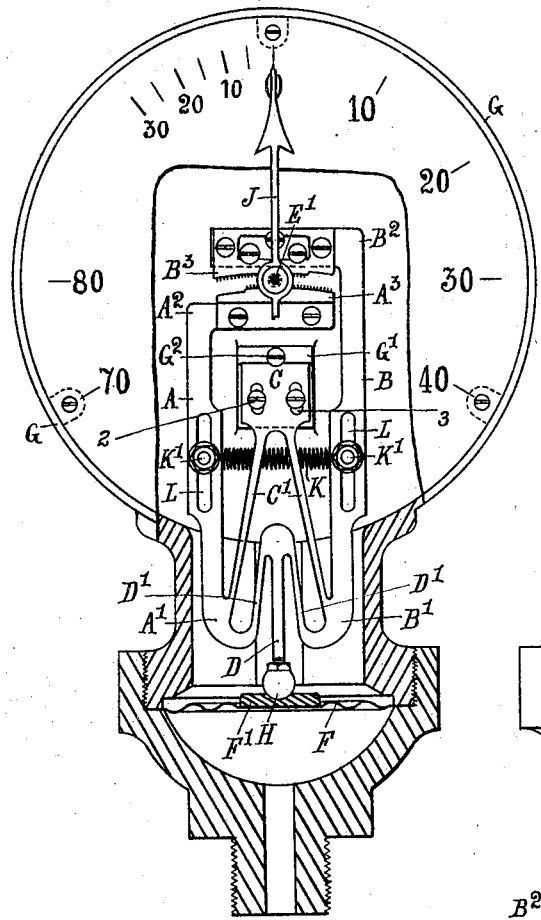
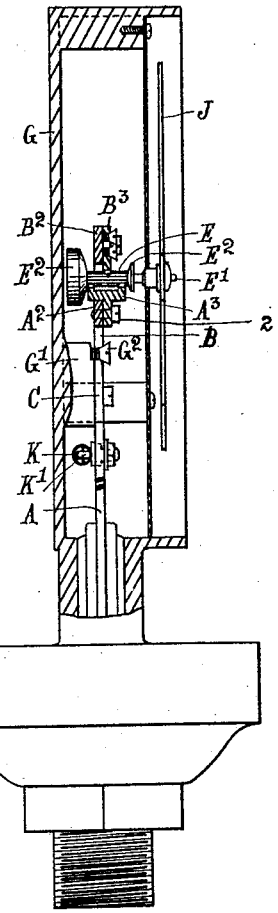
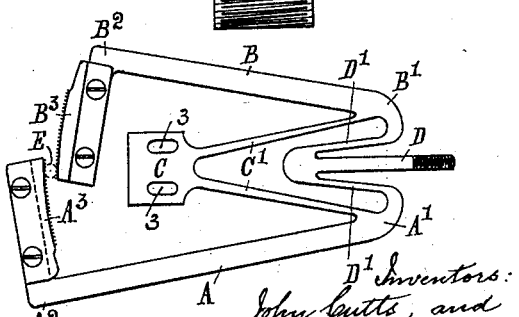
Inventors:
John Cutts, and
William C. Gillott.
by Herbert W. Jenner, attorney.

UNITED STATES PATENT OFFICE.

JOHN CUTTS AND WILLIAM CUNNINGTON GILLOTT, OF NOTTINGHAM, ENGLAND.

FLUID-PRESSURE GAUGE.

1,406,616. Specification of Letters Patent. Patented Feb. 14, 1922.

Application filed September 3, 1915. Serial No. 48,800.

(GRANTED UNDER THE PROVISIONS OF THE ACT OF MARCH 3, 1921, 41 STAT. L., 1313.)

*To all whom it may concern:*

Be it known that we JOHN CUTTS, lace manufacturer, and WILLIAM CUNNINGTON GILLOTT, pressure-gauge maker, subjects of the King of Great Britain, and residents of Nottingham, England, have invented a certain new and useful Improvement in Fluid-Pressure Gauges, of which the following is a specification.

This invention relates to fluid pressure gauges or indicators, and refers to improved mechanism for amplifying the movements of a device which is subject to and deflected by the pressure, such for example as a diaphragm or Bourdon tube, and transmitting such movements to an indicator hand moving round a dial provided with a scale.

In gauges of this description as constructed heretofore, the limited movements obtained say from a diaphragm or the free end of a Bourdon tube, have been amplified and communicated to an indicator hand, by means of a lever or system of levers, terminating in a toothed sector engaging with a pinion on the indicator hand arbor. This construction entails a series of joints, pivots, and bearings for the latter, the use of which necessarily entails a certain amount of friction as well as lost motion between the first member and the indicator hand, which lost motion is a common cause of error and is increased by use, owing to the wear to which the said parts are subjected.

The object of this invention is to provide mechanism that will perform the same office as the ordinary lever and toothed sector mechanism previously employed, but shall be free from the disadvantage of that arrangement.

Referring to the drawings,

Fig. 1. is a front elevation partly in section, and

Fig. 2. a side elevation partly in section, showing our invention applied to a pressure gauge fitted with a diaphragm.

Fig. 3 is a detail front view of a simplified form of the transmitting device shown in Figs. 1 and 2.

Like letters indicate like parts throughout the drawings.

According to the present invention, the limited movements obtained from a diaphragm, or the free end of a Bourdon tube, are amplified and imparted to the indicator hand arbor, by mechanism which is entirely free from joints or bearings, and may if desired be entirely constructed from one piece of metal.

The mechanism described is in the preferred form, comprised of two arms $A$ and $B$ (see Figs. 1. and 3.) disposed one on each side of a fixed part $C$, which latter serves to secure the mechanism to the fixed framing or casing. The ends $A^1$ and $B^1$ of said arms are connected to the fixed part $C$ by spring members $C^1$, and to the upper end of a movable stem $D$ situated between them, by means of spring members $D^1$ as shown. The stem $D$ it will be seen is connected by the spring members $D^1$ to the extremities $A^1$ $B^1$ of the respective arms, whilst the fixed part $C$ is connected by the spring members $C^1$ to a point in each arm which is near to their extremities $A^1$ $B^1$.

The spring members may all be formed integral with the arms $A$ and $B$, as shown, or they may be otherwise rigidly secured to the said arms in any approved way, as by welding, brazing or bolting them to the said arms, but they must not be connected to the said arms by joints which are free to move pivotally.

The result of this arrangement is that when the stem $D$ is forced towards the fixed part $C$, the free ends $A^2$ $B^2$ of the arms $A$ and $B$ are both moved outwards or away from each other. On the other hand when the stem $D$ is moved away from the fixed part $C$, the contrary motion takes place, that is to say, the upper free ends $A^2$ $B^2$ of the arms $A$ and $B$ are made to approach each other.

In order to connect the arms $A$ and $B$ to the indicator hand $J$, the upper free end $A^2$ of the arm $A$, is provided with a toothed sector $A^3$, and the upper free end $B^2$ of the arm $B$ with a toothed sector $B^3$. One of these toothed sectors $A^3$ gears with the opposite side of the pinion $E$ on the indicator hand arbor $E^1$ to the other $B^3$, and both thus serve to move it in the same direction. The toothed sectors $A^3$, $B^3$ may be formed integrally with the arms $A$ and $B$ or be attached thereto as shown, and in the latter construction, provision may be made for conveniently adjusting either one or both of them relatively to the arms to which they are attached.

In a gauge with a diaphragm F as shown in Figs. 1. and 2. the mechanism described is disposed with the lower end of its stem D resting on the diaphragm F, (see Fig. 1.) and with toothed sectors $A^3$ $B^3$ on the free ends of the respective arms A and B engaging with the teeth of the pinion E on the indicator hand arbor $E^1$, and it is secured in this position by attaching the fixed part C securely to the lug $G^1$ on the fixed frame or casing G of the gauge. The part C is secured to the lug by screws or bolts 2 which pass through slots 3 in the part C so that its position may be adjusted vertically. If preferred the lower end of the stem D may be fitted with an adjustable ball H (see Fig. 1.) which fits into a seat provided for it in a seating block $F^1$ in the centre of the diaphragm F. The diaphragm F or other pressure-operated device is in this manner operatively connected with the stem D, and is able to actuate it and the parts secured to it.

The movements of the diaphragm F are thus transmitted to the stem D, and the upward and downward movements of the latter relatively to the fixed part C, causes the free ends $A^2$ $B^2$ of the arms A and B to open out or close in, and thus rotate the pinion E and the indicator hand J.

As the pinion E is situated between the two toothed sectors $A^3$ $B^3$, it is supported by the same, so that a bearing for the rear end portion of the indicator arbor is not required.

The reflex action of the spring members $C^1$ and $D^1$ will affect the return movement of the free ends of the arms A and B, and no spring is required in connection with the indicator hand arbor $E^1$ for returning the hand J to zero or for taking up lost motion.

The gauge may be adjusted to a certain extent by adjusting the position of the mechanism described, so that more or less pressure is put upon the diaphragm F by the spring members $C^1$ and $D^1$, through the intermediary of its central stem D. For this purpose one or more adjustment screws $G^2$ with taper heads may be provided in the lug $G^1$, said screw being so disposed that its taper head acts on the top of the fixed part C of the device, and thus serves to adjust the position relatively to the diaphragm.

As a further means of adjustment, the two arms A and B may be connected by a spring K as shown in Figs. 1 and 2, and the ends of this spring K are connected to studs $K^1$ which are adjustable in slots L in the said arms. By adjusting these studs $K^1$ the power exerted by the spring on the diaphragm may be regulated.

The arms and spring member described may be cut out of one piece of steel of suitable thickness, which is subsequently tempered to give the spring members $C^1$ $D^1$ the required resiliency.

With the arrangement described, the pinion E on the indicator hand arbor, is connected to the diaphragm F or other device by means which are entirely void of joints, and there are no bearings and their attendant friction and lost motion. There are therefore no parts subject to wear, and the gauge is thus not only rendered more accurate but is less affected by long and constant usage.

If preferred the indicator hand arbor $E^1$ may instead of being mounted in bearings, be supported solely by the upper and lower toothed sectors $A^3$ $B^3$ which engages with the pinion E on the said arbor as shown in Figs. 1 and 2. In this construction one or both toothed sectors $A^3$ $B^3$ are made wider or double so as to give the necessary support to the pinion E, and the latter is made longer to correspond with the increased width of the sectors, and is provided with end flanges $E^2$ (see Fig. 2) to retain it in its proper position. The inner one of the two flanges $E^2$, may be made heavy enough to counterbalance the weight of the indicator hand J.

In the simple forms of the transmitting device shown in Fig. 3 the slots L are omitted, but otherwise the device is substantially the same as that shown in Fig. 1.

The mechanism may be adjusted so that the same gauge can be used to indicate pressure either above or below atmospheric pressure.

What we claim as our invention and desire to cover by Letters Patent is:—

1. In a pressure gauge, a transmitting arm provided at one end with means for connecting it with the indicating mechanism, and having at its other end two spring members each rigidly secured to it at one end, one spring member having at its other end a fastening device for connecting it to a stationary support, and the other spring member having at its other end a stem for operatively connecting it with a pressure-operated device.

2. In a pressure gauge, a transmitting device comprising a pair of arms each provided at one end with means for connecting it with the indicating mechanism, and having at its other end two spring members each rigidly connected to it at one end, the two similar spring members of the two arms having their other ends connected together and provided respectively with a fastening device for connecting them with a stationary support and with a stem for operatively connecting them with a pressure-actuated device.

3. In a pressure gauge, a transmitting arm provided at one end with a toothed rack for connecting it with the indicating mechanism, and having at its other end two spring members each rigidly secured to it at one end, one spring member having at its other end a fastening device for connecting it to a stationary support, and the other spring member having at its other end a stem for operatively connecting it with a pressure-operated device.

4. In a pressure gauge, a transmitting device comprising a pair of arms each provided at one end with a toothed rack for connecting it with the indicating mechanism, said racks being arranged with their teeth projecting towards each other, said arms each having at its other end two spring members each rigidly connected to it at one end, the two similar spring members of the two arms having their other ends connected together and provided respectively with a fastening device for connecting them with a stationary support and with a stem for operatively connecting them with a pressure-actuated device.

5. In a pressure gauge, a transmitting device comprising a pair of arms each provided at one end with a toothed rack for connecting it with the indicating mechanism, said racks being arranged with their teeth projecting towards each other, said arms each having at its other end two spring members each rigidly connected to it at one end, the two similar spring members of the two arms having their other ends connected together and provided respectively with a fastening device for connecting them with a stationary support and with a stem for operatively connecting them with a pressure-actuated device, an indicator hand and arbor, and a toothed pinion secured on the said arbor and gearing into and wholly supported by the said racks.

6. In a pressure gauge, a transmitting device comprising a pair of arms each provided at one end with means for connecting it with the indicating mechanism, and having at its other end two spring members each rigidly connected to it at one end, the two similar spring members of the two arms having their other ends connected together and provided respectively with a fastening device for connecting them with a stationary support and with a stem for operatively connecting them with a pressure-actuated device, and an adjusting spring secured crosswise between the said pair of arms.

In testimony whereof we have signed our names to this specification in the presence of two subscribing witnesses.

JOHN CUTTS.
WILLIAM CUNNINGTON GILLOTT.

Witnesses:
H. C. SHELDON,
THOS. H. COOK.